United States Patent
Sofer

(10) Patent No.: US 9,626,417 B1
(45) Date of Patent: Apr. 18, 2017

(54) SYSTEM, METHOD, AND COMPUTER PROGRAM FOR AUTOMATICALLY CONVERTING CHARACTERS FROM AN ISO CHARACTER SET TO A UTF8 CHARACTER SET IN A DATABASE

(71) Applicant: Amdocs Software Systems Limited, Dublin (IE)

(72) Inventor: David Sofer, Askelon (IL)

(73) Assignees: Amdocs Software Systems Limited, Dublin (IE); Amdocs Development Limited, Limassol (CY)

( * ) Notice: Subject to any disclaimer, the term of this patent is extended or adjusted under 35 U.S.C. 154(b) by 359 days.

(21) Appl. No.: 14/259,060

(22) Filed: Apr. 22, 2014

Related U.S. Application Data

(60) Provisional application No. 61/820,734, filed on May 8, 2013.

(51) Int. Cl.
*G06F 17/30* (2006.01)

(52) U.S. Cl.
CPC .............................. *G06F 17/30569* (2013.01)

(58) Field of Classification Search
CPC ................................................ G06F 17/30569
See application file for complete search history.

(56) References Cited

U.S. PATENT DOCUMENTS

| | | | | |
|---|---|---|---|---|
| 3,641,495 A * | 2/1972 | Kiji | ........................... | G06K 9/03 382/227 |
| 5,359,671 A * | 10/1994 | Rao | ...................... | G06K 9/6857 382/225 |
| 5,649,214 A * | 7/1997 | Bruso | .................. | G06F 17/2217 704/8 |
| 5,778,213 A * | 7/1998 | Shakib | .............. | G06F 17/30569 703/27 |
| 5,940,845 A * | 8/1999 | Prager | ............... | G06F 17/30569 704/8 |
| 6,708,189 B1 * | 3/2004 | Fitzsimons | ........ | G06F 17/30569 |
| 7,454,497 B1 * | 11/2008 | Estabrooks | ........... | H04L 41/048 709/203 |
| 8,037,458 B2 * | 10/2011 | Shekov | ............... | G06F 11/3476 714/45 |
| 8,782,101 B1 * | 7/2014 | Moore | .............. | G06F 17/30569 707/602 |
| 9,396,287 B1 * | 7/2016 | Bhave | ............... | G06F 17/30979 |

(Continued)

*Primary Examiner* — James Trujillo
*Assistant Examiner* — Hubert Cheung
(74) *Attorney, Agent, or Firm* — Zilka-Kotab, PC

(57) ABSTRACT

A system, method, and computer program product are provided where non-convertible lines in a database that that are comprised of characters that are not recognized by a codepage of the database are identified as result of a predefined assessment and are then exported from the database. The exported non-convertible lines are automatically converted to convertible lines by using a mapping table, and the non-convertible lines are deleted from the database. After deleting the non-convertible lines, a predefined conversion command is executed on the database, thereby converting all characters of the database from an ISO format to a UTF8 format, and then the convertible lines are imported into the database utilizing a predefined import utility that automatically converts all characters of the convertible lines, once inserted into the database, from the ISO format to the UTF8 format.

4 Claims, 4 Drawing Sheets

(56) References Cited

U.S. PATENT DOCUMENTS

| | | | |
|---|---|---|---|
| 2002/0038305 A1* | 3/2002 | Bahl | G06Q 20/102 |
| 2002/0059113 A1* | 5/2002 | Bahl | G06Q 30/04 705/26.1 |
| 2003/0078921 A1* | 4/2003 | Michael Hsing | G06F 17/30569 |
| 2003/0078982 A1* | 4/2003 | Ogawa | H04N 1/00209 709/206 |
| 2003/0130921 A1* | 7/2003 | Force | G06Q 20/102 705/35 |
| 2003/0130944 A1* | 7/2003 | Force | G06Q 30/04 705/40 |
| 2003/0188022 A1* | 10/2003 | Falkner | G06F 17/30569 709/246 |
| 2005/0091588 A1* | 4/2005 | Ramarao | G06F 17/30908 715/248 |
| 2005/0216896 A1* | 9/2005 | Doleh | G06F 9/541 717/136 |
| 2006/0130021 A1* | 6/2006 | Plum | G06F 11/3624 717/140 |
| 2006/0248521 A1* | 11/2006 | Korn | G06F 17/30569 717/163 |
| 2007/0250494 A1* | 10/2007 | Peoples | G06F 17/30669 |
| 2007/0260571 A1* | 11/2007 | Mansfield | G06F 17/227 706/48 |
| 2008/0033974 A1* | 2/2008 | Cameron | G06F 17/272 |
| 2008/0222121 A1* | 9/2008 | Wiessler | G06F 17/30932 |
| 2008/0301162 A1* | 12/2008 | Wall | G06F 17/30569 |
| 2010/0217750 A1* | 8/2010 | Tokoro | G06F 17/30569 707/640 |
| 2011/0016228 A1* | 1/2011 | Harwell | H04L 67/2823 709/246 |
| 2011/0119317 A1* | 5/2011 | Kazoun | G06F 17/30569 707/809 |
| 2012/0330908 A1* | 12/2012 | Stowe | G06F 17/30955 707/693 |
| 2013/0110854 A1* | 5/2013 | Lockhart | G06F 17/212 707/756 |
| 2014/0188665 A1* | 7/2014 | Baker | G06Q 30/0625 705/26.62 |
| 2014/0188897 A1* | 7/2014 | Baker | G06Q 30/0631 707/748 |
| 2015/0178342 A1* | 6/2015 | Seering | H04L 67/2823 707/754 |

\* cited by examiner

… (US 9,626,417 B1)

SYSTEM, METHOD, AND COMPUTER PROGRAM FOR AUTOMATICALLY CONVERTING CHARACTERS FROM AN ISO CHARACTER SET TO A UTF8 CHARACTER SET IN A DATABASE

CLAIM OF PRIORITY

This application claims the benefit of U.S. Provisional Application No. 61/820,734, filed May 8, 2013, the entire contents of which are incorporated herein by reference.

FIELD OF THE INVENTION

The present invention relates to converting character sets in an ORACLE® database from a single byte character set to a Universal Character Set (UCS) Transformation. Format 8-bit (UTF8) character set.

BACKGROUND

Converting an ORACLE® character set from an international Organization for Standardization (ISO) character set to a UTF8 character set typically entails significant system downtime and the use of significant storage resources because some of the non-ASCII characters need to be transformed from a single-byte character to a multi-byte character. However, when converting text from ISO to UTF8, all characters are converted, regardless of whether each specific character needs to be converted to a multi-byte character or not. To minimize the effort, it is preferable to convert only those characters that must be converted to the multi-byte format, which will minimize the downtime and the storage required. Problematic characters are usually a small percentage of the overall number of characters.

There is thus a need for addressing these and/or other issues associated with the prior art.

SUMMARY

A system, method, and computer program product are provided for automatically converting characters from an ISO character set to a UTF8 character set. In use, a first database csscan command is executed on a database. Additionally, non-convertible lines comprising characters which are not recognized by a codepage of the database are exported from corresponding tables of the database. Further, the non-convertible lines are automatically converted to convertible lines by mapping the characters which are not recognized by the codepage of the database to characters which are recognized by the codepage of the database. In addition, the lines comprising characters which are not recognized by the codepage of the database are deleted from the database. Furthermore, a second database csscan command is executed on the database, thereby verifying that all characters of the database are recognized by the codepage of the database. Still yet, a database csalter command is executed on the database, thereby converting all characters of the database from ISO to UTE8. Moreover, the convertible lines are inserted into the corresponding tables of the database, thereby converting all characters of the convertible lines from ISO to UTF8.

DETAILED DESCRIPTION

Figure 1:
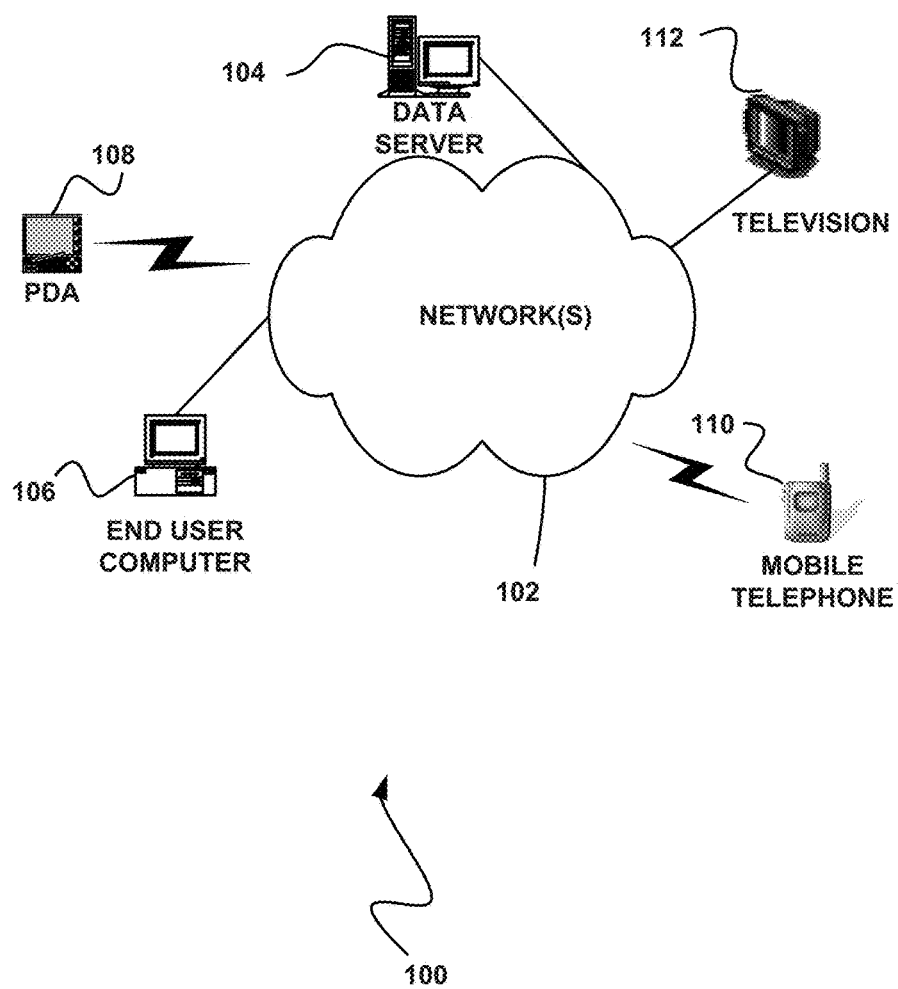
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
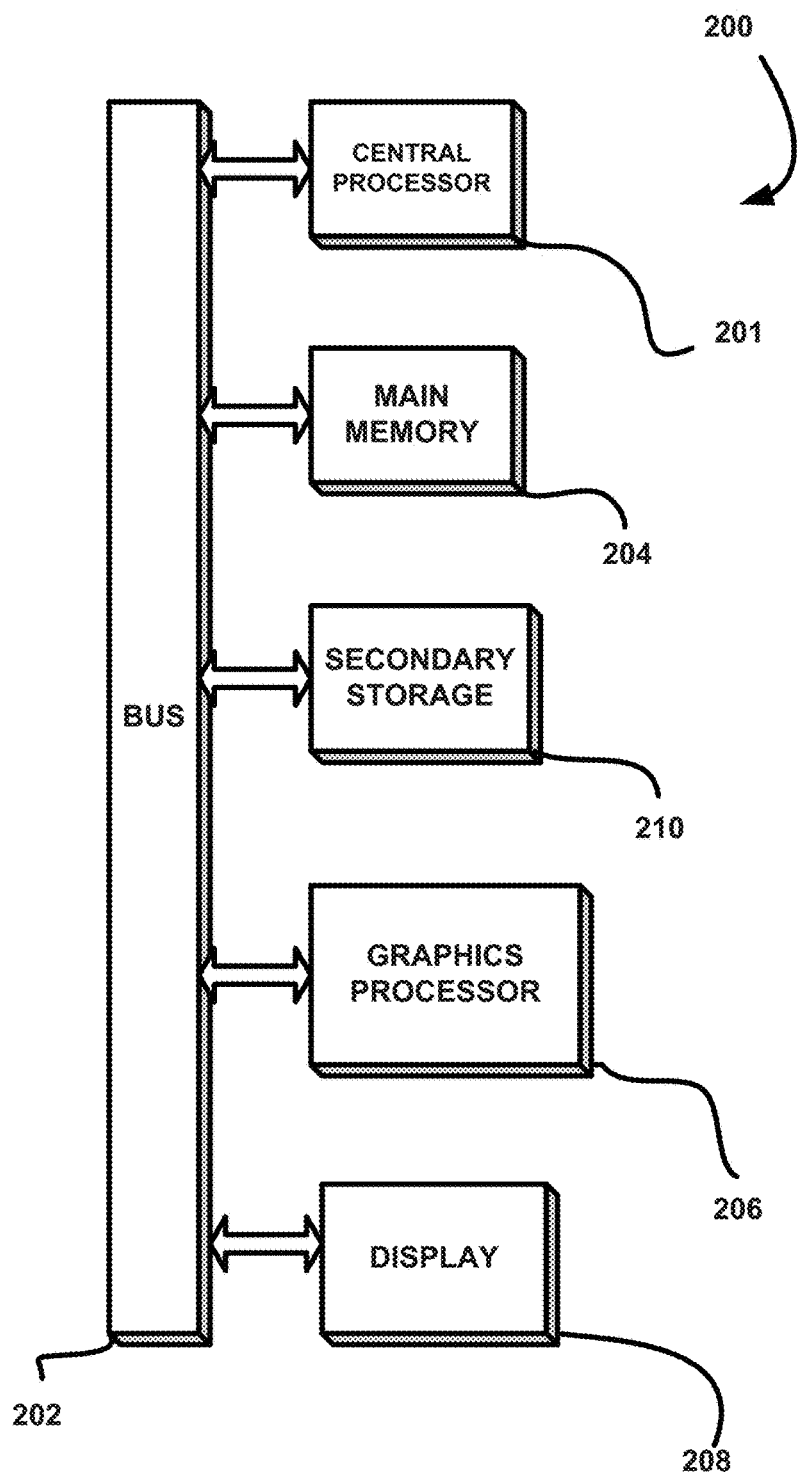
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
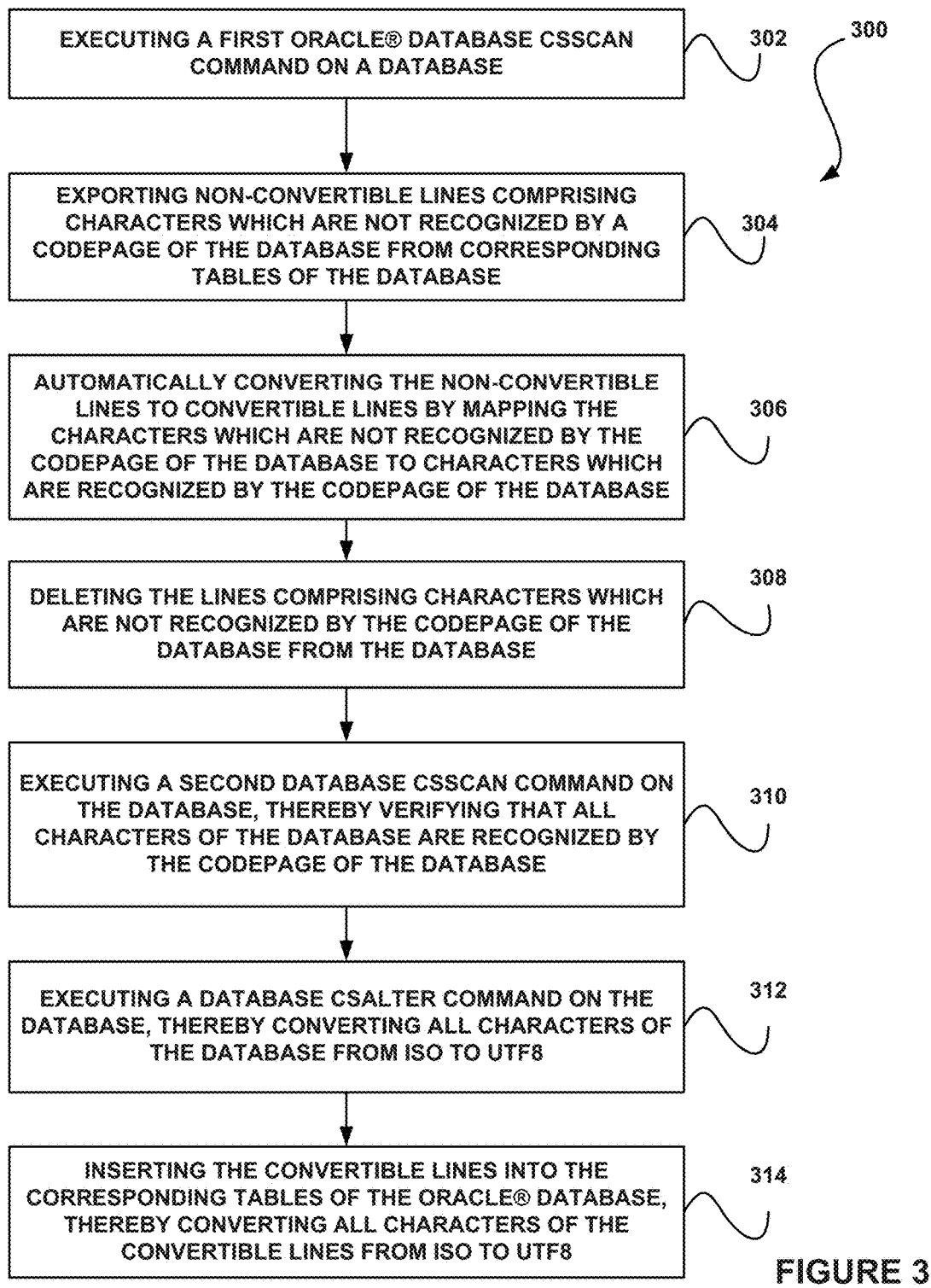
FIG. 3 illustrates a method for automatically converting characters from an International Organization for Standardization (ISO) character set to a Universal Character Set (UCS) Transformation Format 8-bit (UTF8) character set, in accordance with one embodiment.

FIG. 3 illustrates a method 300 for automatically converting characters from an International Organization for Standardization (ISO) character set to a Universal Character Set (UCS) Transformation Format 8-bit (UM) character set, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown, a first database csscan command is executed on a database (e.g. an ORACLE® database, etc.). See operation 302. The database csscan command a known Database Character Set Scanner.

The Character Set Scanner provides an assessment of the feasibility and potential issues in migrating a database (e.g. an ORACLE® database, etc.) to a new database character set. The Character Set Scanner checks all character data in the database and tests for the effects and problems of changing the character set encoding. At the end of the scan, the command generates a summary report of the database scan. This report may show the scope work required to convert the database to a new character set.

In one embodiment, the first database csscan command may produce a list of lines and columns that include unique characters. In this case, the unique characters may include characters that are not recognized by the codepage of the database to which the characters have been inserted.

For example, the unique characters may include convertible characters. The convertible characters may include characters that are capable of being converted to a UTF8 format.

As another example, the unique characters may include truncated fields. The truncated fields may include fields having a predetermined size that is too small to contain converted data. As another example, the converted characters may include multi-byte characters.

As shown further in FIG. 3, non-convertible lines comprising characters which are not recognized by a codepage of the database are exported from corresponding tables of the database. See operation 304. Further, the non-convertible lines are automatically converted to convertible lines by mapping the characters which are not recognized by the codepage of the database to characters which are recognized by the codepage of the database. See operation 306.

In addition, the lines comprising characters which are not recognized by the codepage of the database are deleted from the database. See operation 308. Furthermore, a second database csscan command is executed on the database, thereby verifying that all characters of the database are recognized by the codepage of the database. See operation 310.

Still yet, a database csalter command is executed on the database, thereby converting all characters of the database from ISO to UTF8. See operation 312. The csalter command refers to a known a database administrator (DBA) tool for special character set migration.

As shown further in FIG. 3, the convertible lines are inserted into the corresponding tables of the database, thereby converting all characters of the convertible lines from ISO to UTF8. See operation 314. In one embodiment, inserting the convertible lines into the corresponding tables of the database may include utilizing an import utility to automatically convert imported characters from ISO to UTF8.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
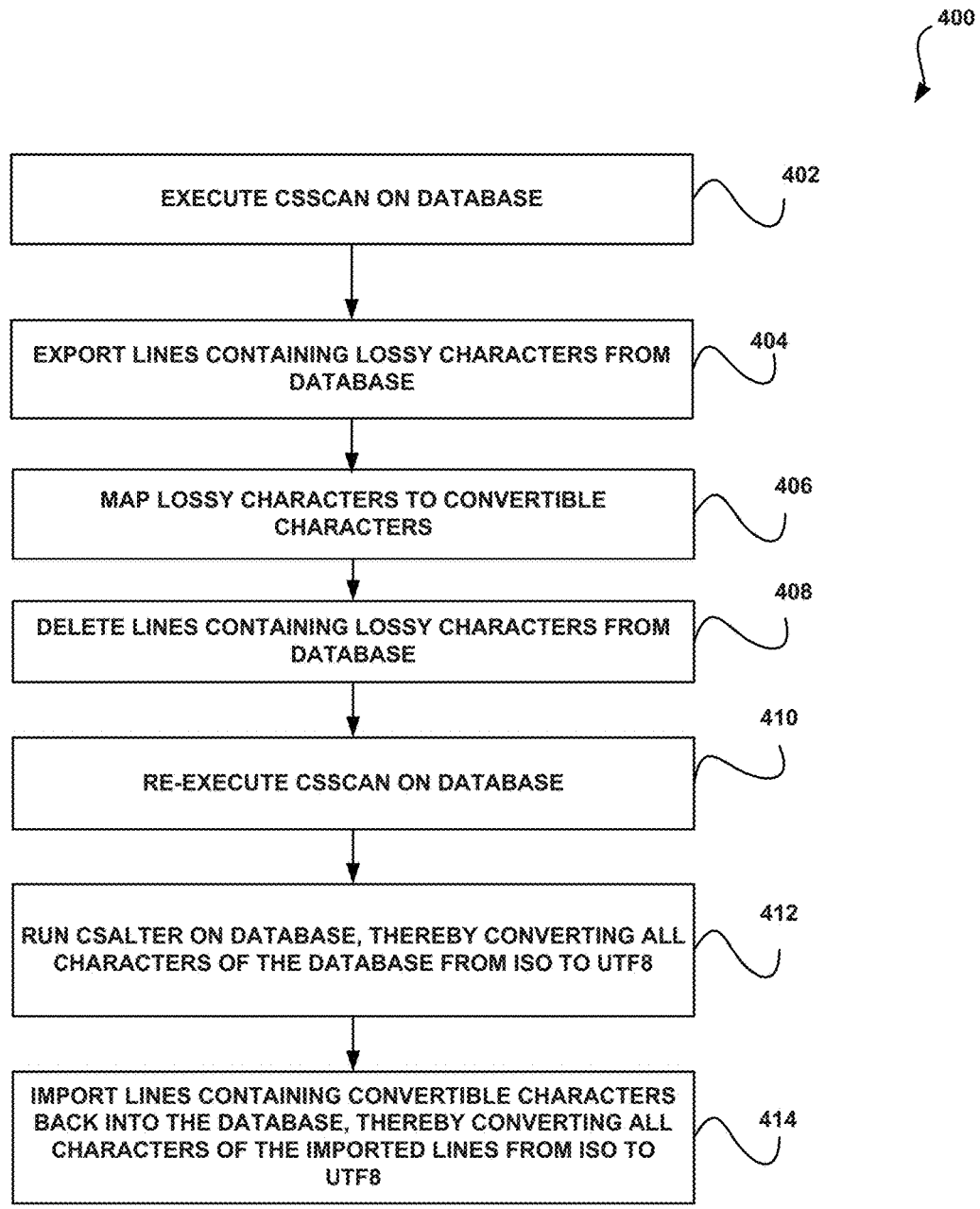
FIG. 4 illustrates a flow diagram for automatically converting characters from an ISO character set stored in a database table to a UTF8 character set, in accordance with one embodiment.

FIG. 4 illustrates a flow diagram 400 for automatically converting characters from an ISO character set stored in a database table to a UTF8 character set, in accordance with one embodiment. As an option, the diagram 400 may be implemented in the context of the details of FIGS. 1-3. Of course, however, the flow diagram 400 may be implemented in the context of any desired environment. Further, the aforementioned definitions may equally apply to the description below.

As shown in FIG. 4, initially, an ORACLE® database csscan command is executed on the relevant database. See operation 402. This scan produces a list of lines and columns that include any of the three types of unique characters. The three types of unique characters may include "lossy" characters, convertible characters, and/or truncated fields.

Lossy characters include characters that are not recognized by the codepage of the ORACLE® database to which they have been inserted. Convertible characters include characters that can be converted to UTF8. Truncated fields include fields having a predetermined size that is too small to contain the converted data, due to some of the converted characters being multi-byte characters.

Lines containing lossy characters are exported from the database. See operation 404. Additionally, using a mapping table, all the lossy characters detected by the csscan operation are converted into characters recognized by the codepage of the particular ORACLE® database. See operation 406.

Furthermore, lines containing the lossy characters are deleted from the database. See step 408. The ORACLE® database csscan command is then re-executed. See operation 410. At this stage, the csscan should report that all the remaining lines of the relevant database are convertible.

Accordingly, an ORACLE® database csalter command is executed on the relevant database. See operation 412. The csalter command is operative to convert the characters of the database from ISO to UTF8.

The lines that were exported (in operation 404) are imported back into the relevant tables of the database. See operation 414. It is appreciated that, responsive to the execution of the csalter command, the database is defined as being a UTF8 compatible database, and therefore the ORACLE® import utility is operative at this stage to automatically convert the imported characters from ISO to UTF8.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   executing a predefined assessment command on a database to identify non-convertible lines in the database that are comprised of characters that are not recognized by a codepage of the database;
   exporting, from the database, the non-convertible lines identified as a result of the execution of the predefined assessment command;
   automatically converting the exported non-convertible lines to convertible lines comprising characters that are recognized by the codepage of the database by using a mapping table that maps the characters of the exported non-convertible lines to the characters that are recognized by the codepage of the database;

deleting the non-convertible lines from the database;

after deleting the non-convertible lines from the database, repeating execution of the predefined assessment command on the database, thereby verifying that all characters of the database are recognized by the codepage of the database;

responsive to the verification that all the characters of the database are recognized by the codepage of the database, executing a predefined conversion command on the database, thereby converting all characters of the database from an International Organization for Standardization (ISO) format to a UTF8 format; and after executing the predefined conversion command, inserting the convertible lines into the database utilizing a predefined import utility that automatically converts all characters of the convertible lines, once inserted into the database, from the ISO format to the UTF8 format.

2. The method of claim 1, wherein the predefined assessment command produces a list of lines and columns that include unique characters that are not recognized by the codepage of the database to which the characters have been inserted.

3. A computer program product embodied on a non-transitory computer readable medium storing computer code executable by a processor to perform a method, comprising:

executing a predefined assessment command on a database to identify non-convertible lines in the database that are comprised of characters that are not recognized by a codepage of the database;

exporting, from the database, the non-convertible lines identified as a result of the execution of the predefined assessment command;

automatically converting the exported non-convertible lines to convertible lines comprising characters that are recognized by the codepage of the database by using a mapping table that maps the characters of the exported non-convertible lines to the characters that are recognized by the codepage of the database;

deleting the non-convertible lines from the database;

after deleting the non-convertible lines from the database, repeating execution of the predefined assessment command on the database, thereby verifying that all characters of the database are recognized by the codepage of the database;

responsive to the verification that all the characters of the database are recognized by the codepage of the database, executing a predefined conversion command on the database, thereby converting all characters of the database from an International Organization for Standardization (ISO) format to a UTF8 format; and after executing the predefined conversion command, inserting the convertible lines into the database utilizing a predefined import utility that automatically converts all characters of the convertible lines, once inserted into the database, from the ISO format to the UTF8 format.

4. A system comprising:

a memory system; and one or more processing cores coupled to the memory system and that are each configured to perform a method comprising:

executing a predefined assessment command on a database to identify non-convertible lines in the database that are comprised of characters that are not recognized by a codepage of the database;

exporting, from the database, the non-convertible lines identified as a result of the execution of the predefined assessment command;

automatically converting the exported non-convertible lines to convertible lines comprising characters that are recognized by the codepage of the database by using a mapping table that maps the characters of the exported non-convertible lines to the characters that are recognized by the codepage of the database;

deleting the non-convertible lines from the database;

after deleting the non-convertible lines from the database, repeating execution of the predefined assessment command on the database, thereby verifying that all characters of the database are recognized by the codepage of the database;

responsive to the verification that all the characters of the database are recognized by the codepage of the database, executing a predefined conversion command on the database, thereby converting all characters of the database from an International Organization for Standardization (ISO) format to a UTF8 format; and after executing the predefined conversion command, inserting the convertible lines into the database utilizing a predefined import utility that automatically converts all characters of the convertible lines, once inserted into the database, from the ISO format to the UTF8 format.

* * * * *